United States Patent Office 3,412,601
Patented Nov. 26, 1968

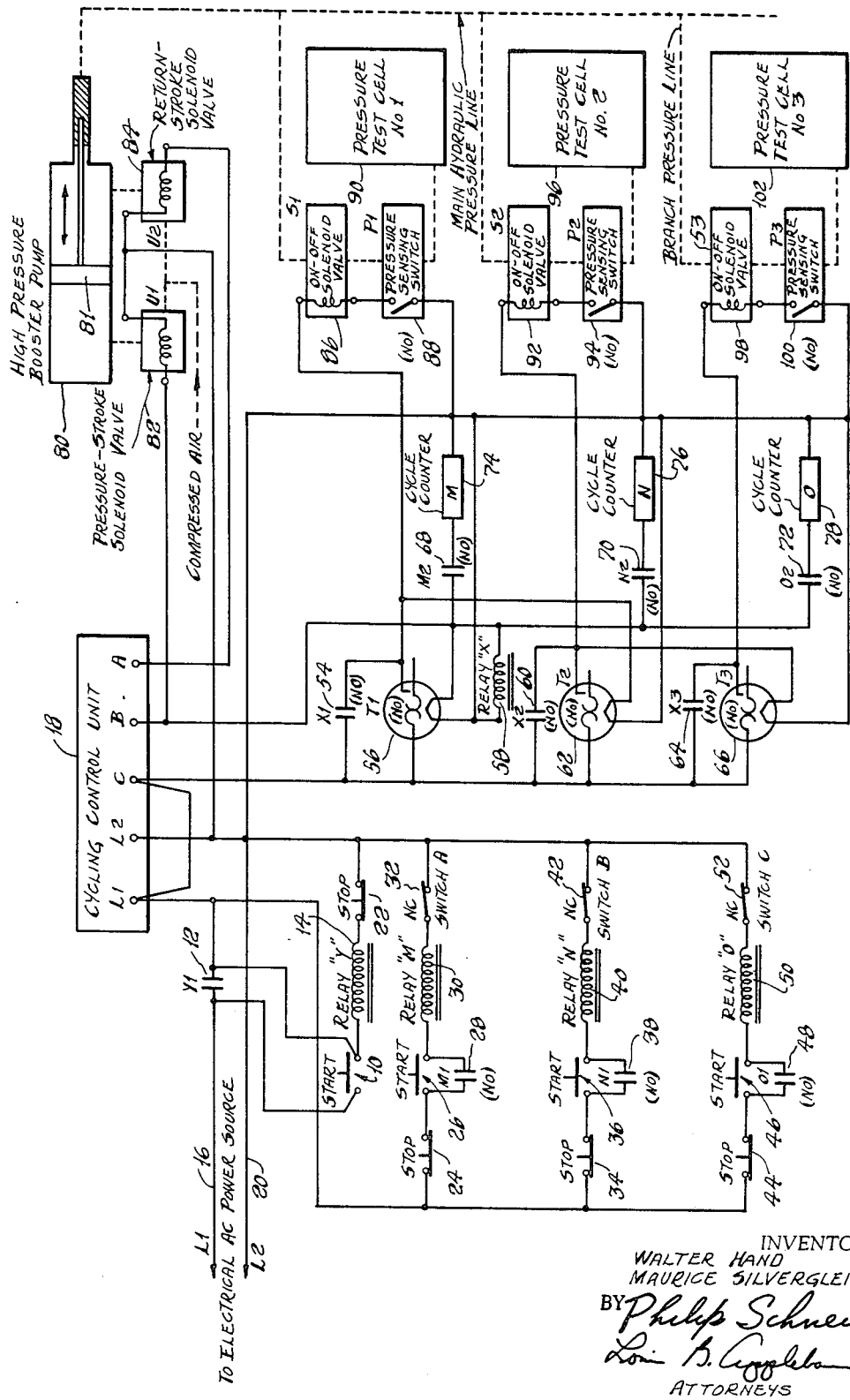

3,412,601
MULTI-PRESSURE CYCLIC FATIGUE SYSTEM
Walter Hand, West Hempstead, and Maurice Silvergleit, Brooklyn, N.Y., assignors to the United States of America as represented by the Secretary of the Navy
Filed Aug. 31, 1966, Ser. No. 576,787
6 Claims. (Cl. 73—91)

ABSTRACT OF THE DISCLOSURE

A pressurizing system in which a plurality of individual test cells are connected to a common pressure source. Associated with each test cell is a different delay element, each of which acts to open the pressure discharge valve of its associated test cell. The electrical circuit configuration is such that at the end of a pressure cycle, the power is removed from the filament of a first thermostatic delay element which opens its contacts after cooling off and removes power from a solenoid, thereby opening the hydraulic line and allowing the pressure in the first test cell to discharge; the opening of the contacts of the first thermostatic delay elements removes power from the filament of a second thermostatic delay element which opens its contacts after cooling off and removes power from a solenoid, thereby opening the hydraulic line and allowing the pressure in the second test cell to discharge. This process is continued for as many test cells as are used in the apparatus.

---

The invention described herein may be manufactured and used by or for the Government of the United States of America for governmental purposes without the payment of any royalties thereon or therefor.

This invention relates to pressurizing systems and especially to a pressurizing system having multiple pressure chambers which are operated at different pressures but are pressurized from the same pressurizing unit.

There is at present a high interest in composite materials, such as epoxy-glass filament materials, because of their high strength-to-weight ratios. This characteristic makes them potentially useful in applications where great pressures are applied to them, for example, in their use as submarine hull materials. Experiments have shown that for deep submergence applications the fatigue properties of materials are their most important limitation. Another limitation is the detrimental effect on the strength of the material caused by repeated water-pressure cyclings.

Thus determination of the fatigue properties such as compressive strength and interlaminar shear strength under various levels of loading has become important and it has become necessary to devise test equipment for simulating the stresses imposed on materials by the environmental conditions which may be encountered.

To test a particular material at various pressure levels over a number of pressure cyclings using only a single sample in a single test cell which is connected to a single pressure source, although economical in terms of equipment is very wasteful in terms of time. To diminish the time required to test a particular material. several samples can be used, each sample being associated with a different test cell, so that the samples can be loaded to different pressures. However, if the various test cells are operated from a common pressure source, trouble is encountered through the possible entrance of higher pressures into lower-pressure test cells if pressure is simultaneously discharged from all test cells. This situation induces transient effects which are undersirable since unknown stresses are applied to the lower-pressure test samples.

The present invention permits any number of test cells to be operated at different pressures from a common pressure source. It accomplishes this by discharging the test cells in sequence, preferably in the order of decreasing test pressure.

The objects and advantages of the present invention are accomplished by electronic means for opening the various pressure test cells in a sequence corresponding to the descending order of pressure values of the cells, the highest pressure cell being vented first, the next highest being vented second, and so on. Thus the pressure released from any cell into the common pressure line cannot be applied to any of the lower-pressure cells while the latter is open.

An object of this invention is to operate a multiplicity of pressure test cells, each at a different pressure, from a single pressure source.

Other objects and advantageous will appear from the following description of an example of the invention, and the novel features will be particularly pointed out in the appended claims.

The single figure is a schematic circuit diagram illustrating a preferred embodiment of the invention.

In the figure, the solid lines between members denote electrical connections and the dotted lines indicate piping for the hydraulic pressure line. Three test cells 90, 96 and 102 are shown although any number may be used. The common pressure source 80 is commonly connected with the test cells. Each test cell, e.g. 90, has associated with it an on-off solenoid valve 86 which operates to open or close the pressure line to the cell, a pressure-sensing switch 88 which is normally open, but closes when a predetermined level of pressure is reached, a cycle counter 74, and a normally open, bimetallic thermostatic delay relay 56. Each test cell also has associated with it a separate set of switches 24, 26 and 32 and a relay 30 for starting and stopping its operation. The operation of the whole system is cyclically controlled by means of the cycling control unit 18 which is a timer and switching circuit.

The components of the system are available as commercially produced units; for example, the test cells 90, 96 and 102 may be similar to the hydraulic cylinders manufactured by the Flick-Reedy Corp. of Bensenville, Ill., the pressure-sensing switches 88, 94 and 100 may be similar to the Model 200, Standard Type, manufactured by Oil-Dyne, Inc., of Minneapolis, Minn., the on-off solenoid valves 86, 92 and 98 may be similar to Model VIIDA11002 manufactured by Skinner Electric Valve Company of New Britain, Conn., the high-pressure booster 80 and the stroke solenoids 82 and 84 may be incorporated in a single unit similar to the air-hydraulic booster, Model AB-4 manufactured by the Flick-Reedy Corp., of Illinois, the cycle counters 74, 76 and 78 may be similar to Model P2-1006 of the Redington Company of Windsor, Conn., the thermostatic delay relays 56, 62 and 66 may be similar to the type 115NO5 delay relay manufactured by the Amperite Corp., of Union City, N.J., and the cycling control unit 18 may be similar to the Dual-Trol Model Cycling Unit manufactured by the Industrial Tuner Corp., of Newark, N.J.

Operation of the system is partially initiated by the system start-stop switching unit comprising the normally open start switch 10, relay Y (14) and normally closed stop switch 22. Operation is started by pressing down the start switch 10, which bridges normally open contacts Y1 (12) of relay Y (14). Bridging these normally open contacts 12 brings the AC power on the L1 line (16) to the L1 terminal of the cycling control unit 18 and to one terminal of the relay Y (14). The other AC power line, L2 (20), is always connected to the L2 terminal of the cycling control unit 18; the start-stop switching units, such as the system start-stop switching unit or the test cell start-stop switching unit which includes normally closed-stop switch 24, normally open start switch 26, relay contacts M1 (28), the coil of relay M (30), and normally closed test sample failure switch A (32); one side of the filaments of the thermostatic delay relays 56, 62 and 66; one side of the cycle counters 74, 76 and 78; one side of the pressure-sensing switches 88, 94 and 100; one side of the pressure-stroke solenoid 82; and one side of the return-stroke solenoid 84.

In the cycling control unit 18, the common terminal C is always connected to the L1 power terminal. The unit 18 functions to switch L1 power between terminals A and B in accordance with a predetermined cycle. The total length of the cycle and the division of time between terminals A and B is adjustable.

Depressing the system start switch 10 brings L1 power to relay Y (14), thereby closing contacts Y1 (12). This places L1 power on relay Y (14) even when the start switch 10 is released. The only way relay Y (14) is deenergized is to depress the stop switch 22, which is normally closed, or by a power failure. This arangement is required because automatic restoration of power after a power failure would resume the cycling of the test samples with the counters deenergized and result in an inaccurate cycle count.

As may be seen from the Figure, L2 power is always connected to one side of the pressure-stroke solenoid 82 and one side of the return-stroke solenoid 84. The cycling control unit 18, after the Y1 (12) relay contacts close, connects L1 power, alternately to the other sides of the solenoids 82 and 84 through terminals B and A, respectively. These solenoids control the operation of on-off valves in the air pressure lines which connect a compressed-air source (not shown) to the high-pressure booster pump 80. The pump 80 applies hydraulic pressure through a common line to each of the test cells 90, 96 and 102.

After the system is turned on by depressing the start switch 10 of the system start-stop switching unit, each test cell is pressurized to a level determined by the setting of its associated pressure sensing switch. The start switches 26, 36 and 46 of the test cell start-stop switching units are now depressed. Taking the first test cell 90 as an example, depressing the start switch 26 energizes relay M (30) thereby closing contacts M1 (28) and holding relay M (30) energized when the start switch 26 is released. Relay contacts M2 (68) are also closed, thereby permitting the cycle counter 74 to operate each time terminal B of the cycling control unit 18 is energized.

Now, when terminal B of the cycling control unit 18 is energized, L1 power is applied to the filaments of the thermostatic delay relay T1 (56) and to relay X (58). This loses contacts X1 (54) applying L1 power to the on-off solenoid valve 86, although this valve 86 does not operate to close off its associated hydraulic pressure line until its pressure sensing switch 88 closes, which occurs when the desired, pre-set pressure level is reached in the test cell 90. After a few instants of time, the delay relay T1 (56) heals up sufficiently to close its contacts, thereby shorting out relay contacts 54 but, taking over their functions of applying L1 power to the on-off solenoid valve 86 and to the filament of the second thermostatic delay relay 62. (It should be noted here that relay X (58) has three sets of contacts, X1 (54) associated with thermostatic delay relay T1 (56), X2 (60), associated with relay T2 (62) and X3 (64) associated with relay T3 (66). Power is initially applied to the filaments of the delay relays by the closing of the contacts of relay X (58) and is then continued to be applied to the filaments of all delay relays after the first in the sequence by the closing of the contacts of the delay relay immediately preceding the one to which filament power is applied—this is true of all delay relays except the first to which filament power is applied by means of terminal B of the switching control unit 18. Thus, the filament of T1 (56) depends on terminal B for its power; the filament of T2 (62) depends on the closing of the contacts of T1 (56) for its power; and the filament of T3 (66) depends on the closing of the contacts of T2 (62) for its power.

The activation of terminal B also applies L1 power to the pressure-stroke solenoid 82, causing it to open its valve and thereby to permit air pressure to move the piston 81 of the high pressure booster pump 80 to the right. This induces a high pressure in the fluid of the hydraulic pressure line which is applied to the test samples in the test cells 90, 96 and 102. Pressure builds up in test cell 90, for example, until a predetermined level is reached, at which time pressure sensing switch 88 closes. This allows L2 power to be applied to the on-off solenoid valve 86, L1 power already being applied thereto through either the X1 relay contacts 54 or the contacts of the thermostatic delay relay T1 (56). Energization of the solenoid valve 86 closes the valve and the pressure line, thus precluding any further build-up of pressure in the test call 90.

When the cycling control unit 18 thereafter deactivates terminal B and activates terminal A, the return-stroke solenoid 84 is energized, allowing the air pressure to force the piston 81 of the pressure booster pump 80 to the left, thereby reducing the hydraulic pressure. At the same time, L1 power is removed from the filament of delay relay T1 (56). The filament cools off and when sufficiently cool, the contacts of the delay relay open to remove L1 power from the on-off solenoid valve 86. This opens the valve, releasing the pressure in the test cell 90, since the pressure in the booster pump 80 is now lower than that in the test cell 90.

The opening of the contacts of the delay relay T1 (56) removes the power from the filament of delay relay T2 (62), allowing its contacts to cool and open after the delay period. This permits the pressure in the second test cell 96 to discharge.

The opening of the contacts of the delay relay T2 (62) removes the power from the filament of delay relay T3 (66), allowing its contacts to cool and open after the delay period. This permits the third test cell 102 to discharge in its turn.

The pressure cycle begins all over again with the deactivation of terminal A and the activation of terminal B of the cycling control unit 18.

If a test sample (e.g., that in test cell 90) fails test sample failure switch A (32) in the test cell start-stop switching unit opens, thereby deenergizing relay M (30). This opens relay contacts M1 (28 and M2 (68). Opening of the latter causes its associated cycle counter 74 to stop counting and breaks the power circuit to the on-off solenoid, valve 86 so that the hydraulic pressure line to the test cell 86 remains open continuously there are no more cyclings of this cell 90 until the test sample therein is replaced and the start switch 26 is depressed again. The cycle counter 74 should be reset before the switch is depressed.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. A system for testing a plurality of samples of material comprising, in combination:

a plurality of pressure test cells for applying pressure to said test samples;

a single source of pressure;

pressure lines connecting said pressure source to said test cells, said lines including a main pressure line from said source and branch lines from said main line, a different branch line going to each test cell;

a plurality pressure-level control means each associated with a different one of said branch lines and each including a valve means for opening and closing its associated branch line, each branch line being closed when the pressure in its associated test cell reaches a predetermined level which generally differs from cell to cell;

a plurality of delay means arranged to sequentially remove power from said pressure-level control means so that pressure is discharged from only one test cell at a time, each subsequent delay means in the sequence being operationally activated by the preceding one; and cycling control means comprising cycling and switching means for applying power during a preset period of time to said pressure source for increasing the pressure in the system and to the first delay means in the operating sequence to activate its operation, and for applying power during another preset period of time to said pressure source for decreasing the pressure in the system, power being removed from said first delay means during this latter period of time, said pressure cells being vented into the common main pressure line in the order of descending pressure values, the highest pressure cell being vented first and the lowest being vented last, so that venting of higher pressure cells does not cause overpressure in any lower pressure cell.

2. A system as set forth in claim 1, including:

means for applying power to activate and inactivate the operation of said cycling control means and said pressure source; and means for individually applying power to activate and inactivate the operation of each of said pressure-level control means and said delay means.

3. A system as set forth in claim 2, said plurality of pressure-level control means including a plurality of pressure-sensing means, each of the latter being associated with a different test cell and operating to activate its associated valve means when the pressure in the test cell reaches its predetermined level.

4. A system as set forth in claim 2, including:

a plurality of cycle-counting means, each being associated with a different set of said valve means for indicating the total number of pressure cycles which have occurred in the associated test cell.

5. A system as set forth in claim 4, wherein:

each of said delay means comprises a thermostatic delay relay.

6. A system as set forth in claim 5, wherein:

each of said pressure-sensing means is a pressure-operated switch;

each of said valve means is a solenoid-operated valve;

each of said means for individually applying power comprises a normally closed stop switch, a normally open start switch, a coil of a relay, a normally closed test sample failure switch and a pair of normally open contacts belonging to said relay, the contacts being connected so as to bridge said start switch; and each of said means for applying power to activate and inactivate the operation of said cycling control means and said pressure source comprising a normally open start switch, the coil of a relay, a normally closed stop switch and a pair of normally open contacts of said relay, the contacts being connected so as to bridge said start switch.

References Cited

UNITED STATES PATENTS

| | | | |
|---|---|---|---|
| 2,467,129 | 4/1949 | Huber | 73—15.6 |
| 3,102,415 | 9/1963 | Hanggi et al. | 73—91 X |
| 3,196,677 | 7/1965 | Day et al. | 73—88 |

RICHARD C. QUEISSER, *Primary Examiner.*

J. H. WILLIAMSON, *Assistant Examiner.*